G. S. JOHNSTON, F. A. IHRCKE AND C. A. PARTENHEIMER.
GOGGLES.
APPLICATION FILED AUG. 1, 1919.

1,338,508. Patented Apr. 27, 1920.

Inventors
George S. Johnston
Frank A. Ihrcke
Cyrus A. Partenheimer

Witness:
Harry S. Gaither

UNITED STATES PATENT OFFICE.

GEORGE S. JOHNSTON, OF EVANSTON, AND FRANK A. IHRCKE AND CYRUS A. PARTENHEIMER, OF CHICAGO, ILLINOIS, ASSIGNORS TO GEORGE S. JOHNSTON COMPANY, OF CHICAGO, ILLINOIS, A CORPORATION OF ILLINOIS.

GOGGLES.

1,338,508.  Specification of Letters Patent.  Patented Apr. 27, 1920.

Application filed August 1, 1919. Serial No. 314,754.

*To all whom it may concern:*

Be it known that we, GEORGE S. JOHNSTON, a citizen of the United States, residing at Evanston, in the county of Cook and State of Illinois, and FRANK A. IHRCKE and CYRUS A. PARTENHEIMER, both citizens of the United States, residing at Chicago, in the county of Cook and State of Illinois, have invented certain new and useful Improvements in Goggles, of which the following is a specification.

This invention relates to a goggle that is adaptable to many different uses; more particularly it is concerned with a novel and improved goggle frame of simple construction, within which the lenses or glasses are secured in a readily detachable manner. In addition, the invention exhibits a means for tightening the lenses within the goggle frame that serves also as a pad or cushion for the nose by which the device is rendered more comfortable for wear.

Figure 1:
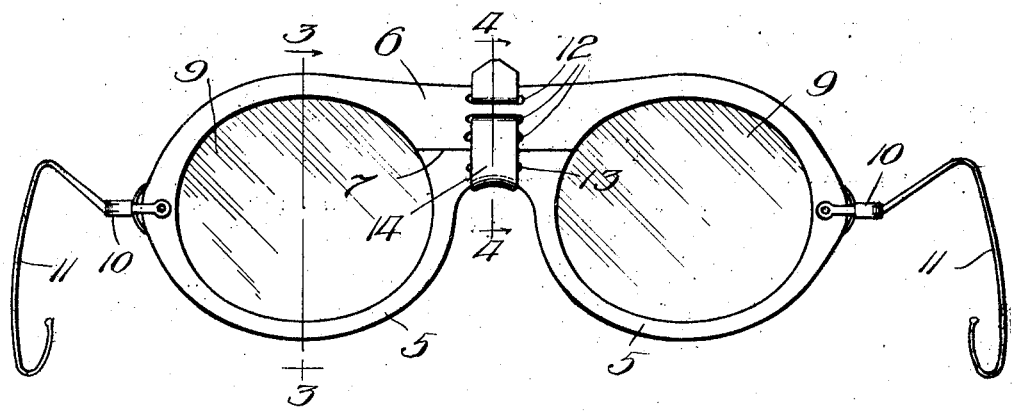
Figure 2:
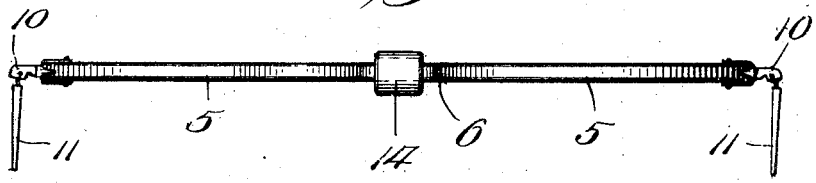

A suggestive embodiment of this invention is illustrated in the accompanying drawing, Figure 1 being a front elevation of the goggle;

Fig. 2, a bottom view thereof; and

Figure 3:
Figure 4:
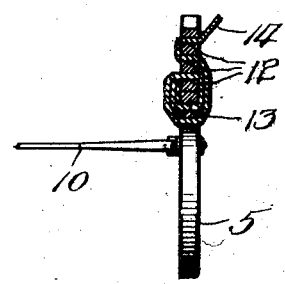

Figs. 3 and 4 transverse sections taken respectively on lines 3—3 and 4—4 of Fig. 1.

The present goggle frame may be conveniently made of one piece, and from some such material as fiber, in the proper shape to provide the usual eyes 5 connected by a bridge 6, which, according to our invention, is formed with a horizontal slit 7 extending between the two eyes. By this construction the two parts of the bridge that lie on opposite sides of the slit may be slightly separated whenever an insertion or removal of the lenses is desired. As best shown in Fig 3, each eye of the goggle frame is suitably channeled as at 8 to provide a mounting for the lenses 9, and is equipped at its outer end with the usual hinge 10 to which a temple 11 is secured.

Centrally of the bridge on opposite sides of the slit 7 we have provided a number of slots, those above the slit being designated as 12 and those below as 13. Through the slits so formed a strap 14 is woven or extended in a manner to frictionally engage with the upper and lower portions of the bridge so that these portions may be drawn tightly upon each other and securely held in such relation. A suggestive manner of arranging the strap is shown in Fig. 4, where it will be noted that it serves to hold tightly together the two portions of the bridge on opposite sides of the slit so as to maintain the lenses securely within the frame. The strap is preferably extended around below the lower edge of the bridge to provide a nose rest or pad.

The present goggle is advantageous in that it may be made of an inexpensive and light material, such as fiber, or any other suitable substance, which is capable of being sprung or bent in the manner described to permit insertion or removal of the lenses. In addition the method of holding the divided portions of the bridge tightly together assures that the lenses will be held securely in place, and provides further a pad or cushion that is adapted to rest upon the nose when the goggle is being worn.

We claim:

1. A goggle having a one-piece frame formed to provide two eyes and a connecting bridge, the bridge having a slit extending between the eyes, and having slots formed in its body on opposite sides of the slit, and a means of connection extending between the slots on opposite sides of the bridge whereby said portions are held together, substantially as described.

2. A goggle having a one-piece frame formed to provide two eyes and a connecting bridge, the bridge having a slit extending between the eyes, and having a slot formed in its body on each of the opposite sides of the slit, and a strap extended through the slot on each side of the slit and around the lower edge of the bridge, said strap serving to connect together the split portions of the bridge and to provide a pad for the nose, substantially as described.

3. A goggle having a frame consisting of two channeled eyes connected by a split bridge, the frame being resilient to allow the lenses to pass into and out of operative position when the split in the bridge is widened, and removable and adjustable means for holding the split portions of the bridge in engagement with each other, whereby during such engagement the lenses are secured removably in position, substantially as described.

4. A goggle having a split frame so split that it may be expanded to allow a lens to be inserted or removed and slotted adjacent said split, in conjunction with a strip of flexible material woven through said slots and across the split to bind together the ends of the frame and securing the crystal in place and for a nose cushion, substantially as described.

5. A goggle having a split frame so split that it may be expanded to allow a lens to be inserted or removed and slotted adjacent said split, in conjunction with a strip of flexible material woven through said slots and across the split to bind together the ends of the frame and securing the crystal in place, substantially as described.

GEO. S. JOHNSTON.
FRANK A. IHRCKE.
CYRUS A. PARTENHEIMER.